United States Patent [19]

Berner

[11] 4,349,731
[45] Sep. 14, 1982

[54] COMMODITY KEY WITH ON SITE ENCODING FEATURE

[75] Inventor: George J. Berner, Xenia, Ohio
[73] Assignee: Hobart Corporation, Troy, Ohio
[21] Appl. No.: 112,664
[22] Filed: Jan. 16, 1980
[51] Int. Cl.³ .................. G06K 21/00; G06K 7/14
[52] U.S. Cl. .......................... 235/489; 235/458
[58] Field of Search ........................ 235/489, 458

[56] References Cited

U.S. PATENT DOCUMENTS

| | | | |
|---|---|---|---|
| 2,742,222 | 4/1956 | Braccio | 235/489 |
| 3,436,736 | 4/1969 | Platt et al. | 235/489 |
| 3,592,973 | 7/1971 | Gray | 235/489 |
| 3,961,747 | 6/1976 | Small et al. | 235/489 |
| 3,989,929 | 11/1976 | Treiber | 235/432 |

Primary Examiner—Daryl W. Cook
Attorney, Agent, or Firm—Biebel, French & Nauman

[57] ABSTRACT

A commodity key for use in connection with radiation sensitive encoding devices provides a unique pattern of radiation identifying the type and/or unit price of a commodity in a computing scale. The key has an elongated body (10) with a code area (20) formed of a frangible plastic material opaque to the radiation used in the encoding device. The code area has a first plurality of insets or blind holes (21) in one side thereof, and a complementary second plurality of insets or blind holes (25) in the opposite side. The sets of insets are individually adjacent and aligned to define potential radiation transmissive openings through the code area, and the insets in one set are somewhat larger than the insets in the other set. The material (27) dividing adjacent insets thus is readily frangible in response to pressure exerted thereon through the smaller of the adjacent insets to form effective radiation transmissive openings, thereby facilitating on-site encoding of a key.

4 Claims, 6 Drawing Figures

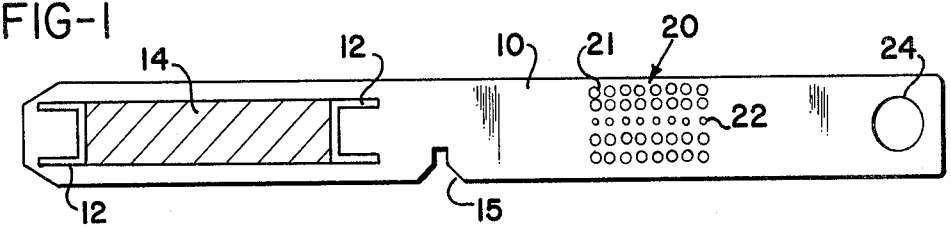
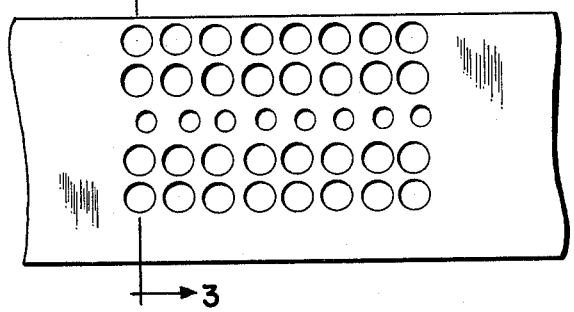
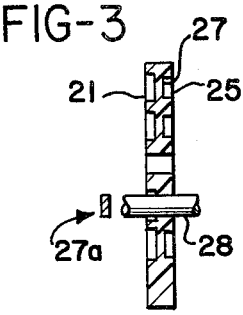
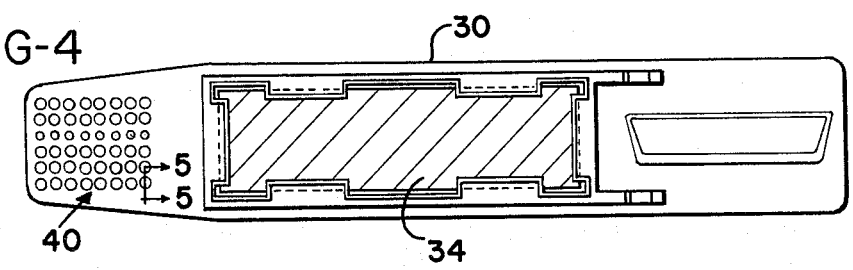
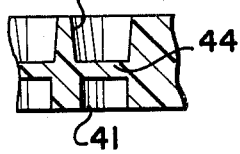
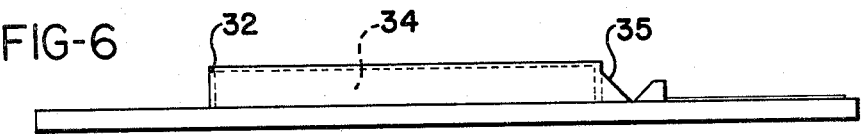

COMMODITY KEY WITH ON SITE ENCODING FEATURE

BACKGROUND OF THE INVENTION

This invention relates to a commodity key as used in a computing scale and labeling system, such as shown in U.S. Pat. No. 3,961,747 issued June 8, 1976 and No. 3,989,929 issued Nov. 2, 1976 to Hobart Corporation, assignee of this application. The commodity key shown in those patents is typical of prior art devices which include a printing area, usually a raised type rubber printing plate, together with a code area which bears a unique code identifying in some machine readable form the commodity which is identified in human readable form on the printing area.

In the past, the code has been provided by drilling a pattern of holes arranged in a unique pattern within several rows on a key having a metal body. The user purchases the key from a supplier, and the code already is formed in the key. The key is used by inserting it into an appropriate receiving slot in a computing scale system, and the code area is read by a plurality of light sensitive devices such as photodiodes upon which a light source is directed selectively by the pattern of holes through the key. It has been found, however, desirable to have the ability to encode special code information into the commodity key, and it is generally desirable to provide the user with blank keys which he can encode appropriately on site, and to which he can attach the corresponding printing plate or patch. Such a key must, however, be durable enough to withstand the handling, such as insertion and removal in the scale system, encountered in every day use.

SUMMARY OF THE INVENTION

The present invention provides such a commodity key wherein at least the code area of the key is formed of a durable yet frangible material, such as a molded thermoplastic, the material being opaque to the radiation (usually light) used in the encoding device. The code area of the key has a first plurality of insets or blind, e.g. partial, holes in a pattern of rows on one side thereof, and a complementary second plurality of insets or blind holes on the opposite side. These insets or partial holes are aligned to define potential radiation transmissive openings through the code area, and preferably the insets on one side are somewhat larger than the corresponding insets on the other side.

The user can, with a suitable hand operated punch, pierce the relatively thin web of the plastic material between a selected set of holes, thereby breaking away or punching out the material to form a radiation transmissive opening. In other words, in a typical installation a light transmitting opening is formed on site to admit light to a selected one or more of the encoding photodiodes according to the pattern of holes that are punched through.

Preferably the insets on one side of the code area are somewhat larger, for example somewhat greater in diameter, than those on the other side. This has been found to produce a clean, rather than ragged, opening through the code area, thereby providing an effective radiation transmissive opening which is essentially uniform wherever provided, thus minimizing slight differences in radiation level to which the different photodiodes are exposed during reading of the code information.

Accordingly, the object of the present invention is to provide such a commodity key which includes a code area formed of a frangible material opaque to the radiation from the source used in the encoding device, with the code area having complementary patterns of insets or blind holes on opposite sides thereof, aligned such that the material between two adjacent holes on opposite sides can readily be removed by a simple tool, at the site of use of the key; and to provide such a key wherein the blind holes or insets on one side are slightly larger in area than those on the opposite side, to assure an essentially uniform effective radiation transmissive opening being formed when the web of material separating two of the holes is removed, as by punching it out.

Other objects and advantages of the invention will be apparent from the following description, the accompanying drawings and the appended claims.

BRIEF DESCRIPTION OF THE DRAWINGS

FIG. 1 is a plan view of a typical commodity key embodying the features of the invention;

FIG. 2 is an enlarged view of the code area of the key seen in FIG. 1;

FIG. 3 is a cross-sectional view taken on line 3—3 in FIG. 2;

FIG. 4 is a plan view of another embodiment of commodity key according to the invention;

FIG. 5 is an enlarged fragmentary cross-sectional view taken on line 5—5 in FIG. 4;

FIG. 6 is a side view of the modified form of key shown in FIG. 4.

DESCRIPTION OF THE PREFERRED EMBODIMENT

Referring to FIG. 1, a commodity key is shown as having a body 10 with a pair of barrier members 12 formed upwardly from the body and defining the attachment region for the printing plate or patch 14. Usually, this plate is fastened in the region shown by a suitable adhesive. Next to this area a notch 15 is formed in the key, its purpose being to engage a controlling finger or probe (not shown) in order to control operation of the computing scale mechanism. Details of a typical arrangement are described in U.S. Pat. No. 2,948,465.

The code area 20 is comprised of a plurality of insets or blind holes 21, arranged in multiple rows, preferably on either side of a row of through holes 22 which function as clock control apertures for the purpose of controlling the reading of code data as the key is inserted into the mechanism. At the opposite end of the key body there is a large hole 24 which provides a convenient means for storing the key, as by hanging it on a pin in a rack.

As seen in FIG. 3, the holes 21 are aligned with holes 25 in a corresponding group of insets or blind holes, leaving a relatively thin web 27 of the material extending across the region between a corresponding set of holes, but sufficient to be opaque to the light or other radiation used by the reading mechanism. For example, the body 10 may be 0.062 inch in thickness, while the web 27 may be 0.010 to 0.015 inch in thickness.

The key may be provided to the user in a blank form, with none of the holes 21, 25 punched through, and without a printing plate 14 in place. The user then obtains and applies the appropriate plate and, using a simple hand punch tool 28, he knocks or punches out appropriate ones 27a of the intervening web material 27 according to a code pattern identifying the commodity, which is also identified in human readable form by the information on the printing plate. This information can be made available to the user in a set of instructions with the scale system. Of course, the code can also provide other information if desired, but the usual practice is to encode commodity identification, which may be used by a printer of machine readable codes (Universal Product Code or U.P.C.).

The web of material, as can be seen in FIG. 3, is located intermediate the opposite surfaces of the key body, and the punch tool 28 operates from the side of the smaller hole 25, working toward the larger hole. This minimizes any tendency of the material to chip, and if there is any chipping, it is in the general direction of the end of the smaller hole 25 toward the blind end of the larger hole 21, thus any irregularity due to chipping does not have an effect on the view looking through the hole. Therefore, the hole which results is essentially smooth, and forms an effective radiation transmissive opening which is essentially alike for all the holes so created. This in turn minimizes the possibility of slight changes in radiation level to the reading photodiodes.

The embodiment shown in FIGS. 4, 5 and 6 represents essentially the same elements in a modified arrangement of a commodity key. The body 30 has a raised rectangular wall area 32 which provides a mounting region for the printing plate 34, located generally in the center of the key, and the code area 40 is located near the tip of the key, in a somewhat tapered or tongue like part. The interlock notch 35 is formed by a pair of V-shaped regions extending from the walls of the plate mounting part 32.

The code area is provided with five rows of holes, the smaller holes 41 being located opposite the larger holes 42 which, in this case, are somewhat tapered or chamfered, leaving the web area 44 therebetween. Use of the modified form of key is the same as previously described.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A commodity key for use in connection with radiation sensitive encoding devices to provide a unique pattern of radiation identifying the type and/or unit price of a commodity in a calculating device, said key comprising an elongated body having an area for mounting a marking stamp and a code area formed of a plastic material which is locally frangible in response to localized pressure, said code area having first and second flat opposite sides and being relatively thin in comparison to its width and length, said code area having a first set of blind holes on the first side thereof and a second set of blind holes on the second side thereof aligned as pairs with said first set of holes whereby said material between pairs of holes provides a selectively removable radiation block, such material being removable in response to pressure applied through one hole of a pair to permit on-site encoding of the commodity key with an appropriate tool.

2. A commodity key as defined in claim 1, wherein at least said code area is formed of a frangible plastic material.

3. A commodity key as defined in claims 1 or 2, wherein the holes in one of said sets are slightly larger in cross-sectional area than the holes in the other set.

4. A commodity key for use in connection with radiation sensitive encoding devices to provide a unique pattern of radiation identifying the type and/or unit price of a commodity in a calculating device, said key comprising an elongated body having a code area formed of a frangible material which is opaque to the radiation used in the encoding device, said code area having a first plurality of insets in one side thereof and a complementary second plurality of insets in the opposite side thereof, said first and second sets of insets being individually adjacent and aligned to define potential radiation transmissive openings through said code area, the insets in one of said sets being somewhat larger than the insets in the other set whereby the material of said code area dividing adjacent insets is readily frangible in response to pressure exerted thereon through the smaller of the adjacent insets to form an effective radiation transmissive opening.

* * * * *